UNITED STATES PATENT OFFICE.

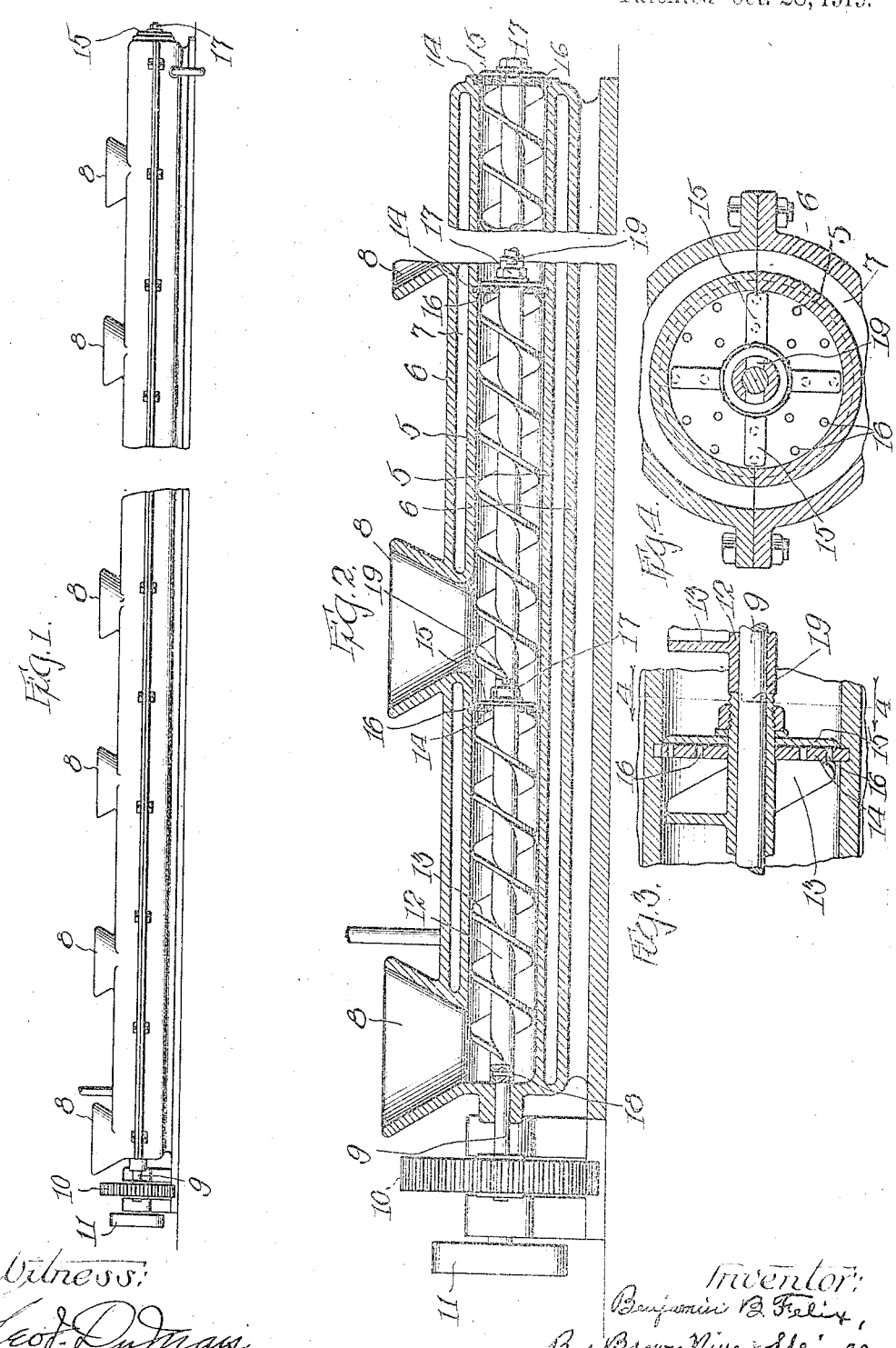

BENJAMIN B. FELIX, OF CHICAGO, ILLINOIS.

RUBBER-MIXING MACHINE.

1,320,128. Specification of Letters Patent. Patented Oct. 28, 1919.

Application filed November 16, 1916. Serial No. 131,637.

*To all whom it may concern:*

Be it known that I, BENJAMIN B. FELIX, a citizen of the United States, residing at Chicago, in the county of Cook and State of Illinois, having invented certain new and useful Improvements in Rubber-Mixing Machines, of which the following is a specification.

My invention relates to machines for mixing rubber compounds, and the like, and has for its object the provision of simple and efficient mechanism for automatically and continuously mixing ingredients for making raw rubber compounds, and the like, and permitting the ingredients to be added at different stages of the mixing. A further purpose is the provision of a mechanism which requires a minimum amount of labor to operator. Other objects will appear hereinafter.

An embodiment of my invention is shown in the accompanying drawing forming a part of this specification, and in which—

Figure 1 is a broken side elevation of a mixing machine embodying my invention;

Fig. 2 is an enlarged longitudinal broken section of the same;

Fig. 3 is an enlarged longitudinal section showing details of cutting mechanism used in the device; and, Fig. 4 is a section taken on line 4—4 of Fig. 3.

In the manufacture of raw rubber compounds, and the like, it is necessary to mix the ingredients making up such compounds very thoroughly in order to overcome their sticky qualities which causes them to adhere to the machine and interfere with their mixing. This is especially true of the rubber used in the compound. In the mixing of these ingredients, it is necessary to chop or cut the ingredients into very fine particles a number of times before they are sufficiently mixed to obtain the desired compounds. This entails considerable labor where the ingredients must be fed through a machine several times. To overcome this, I have provided a machine in which the materials may be fed into the device and automatically forced through a plurality of cutters so that when the materials emerge from the machine, they are thoroughly mixed.

Referring more particularly to the drawing, I preferably provide a substantially tubular casing 5 long enough to house any desired number of cutting and mixing mechanisms. In ordinary practice, I find that about ten mixing and cutting mechanisms are desirable, however, this number may be increased or decreased as desired. The casing 5 is preferably made in an upper and lower half with a jacket 6 extending entirely around it to provide a cooling chamber 7 for the circulation of the cooling medium, such as water, to absorb heat produced by friction in the operation of the machine. The casing 5 is preferably provided with a plurality of feed hoppers 8 in its upper half which communicate with the interior of the casing so that part of the materials or ingredients used in making up the rubber compounds, and the like, may be fed into the casing at different positions therein and at different stages of the mixing. It will also be apparent that one or more of these hoppers may be used as desired, and when any one or more of the hoppers are not used, then the materials will be forced by such hopper or hoppers by the conveyers, described later.

In the axis of the casing 5, I provide a shaft 9 which carries a gear 10, meshing with a smaller or reducing gear, not shown, which is driven by a pulley 11 from a suitable source of power, not shown. The shaft 9 preferably extends entirely through the casing 5. On the shaft 9 is provided a plurality of conveyers, each of which comprises a tubular center portion 12 with a spiral web or fin 13, which coöperates with the inner wall of the casing to force material through the latter. At the end of each conveyer, on the inner periphery of the casing 5, I provide a circular groove which is formed with a half in each part of the casing. In each of the grooves I provide a perforated disk 14 which forms a kind of partition separating the interior of the casing 5 into small compartments. Each disk 14 is provided with an opening at its axis, in which an end portion of one of the conveyers is mounted. Such conveyer extends through said disk and is provided with a knife 15 rigidly secured thereto. The knife 15 is adapted to rotate with the conveyer against the perforated disk 14 and coöperate therewith to shear off the materials as they are fed by the conveyer through the perforations 16 of said disk 14. The end of the conveyer which passes through a disk 14 is threaded, and a nut 17 is threaded on said extended end of the conveyer for locking the knife 15 on the conveyer. A pin 18 is fitted through the first conveyer and shaft 9 to lock such conveyer to the shaft. Each of the other conveyers is locked to its next adjacent conveyer by a slot and lug connection 19, such as is clearly indicated in Figs. 2 and 3. It will be apparent, however, that when so desired, pins 18 may also be used to secure the other conveyers to said shaft 9.

In the operation of the device, a part of the material is preferably fed in the first hopper 8 and forced through the first perforated disk 14 where it is cut off by the first knife 15 as it passes through the perforations 16 in said disk. When the material passes the first disk and knife, other portions of the ingredients may be added at the second hopper 8, and these ingredients can pass through the second disk 14 and knife 15. In a like manner, other parts of the ingredients may be added at the other hoppers 8, as desired. When the ingredients emerge from the last disk 14, they are in the desired condition for vulcanizing or further manipulation.

While I have illustrated and described the preferred form of my invention, I do not desire to be limited to the precise details set forth, but desire to avail myself of such variations and changes as come within the scope of the appended claims.

I claim:—

1. A rubber compound mixing machine comprising a substantially tubular casing divided longitudinally into two halves, there being a plurality of spaced feed openings in the casing and a circular groove in the inner periphery of the casing in each space between the feed openings with a half of each groove in each half of the casing; a perforated disk having its edge disposed in each circular groove; a shaft extending through the axes of all of said disks and said casing; conveyers secured on said shaft between said disks; and a knife mounted on each conveyer adjacent one of the disks and adapted to coöperate with the latter to provide cutting and mixing means.

2. A rubber mixing machine comprising a substantially tubular casing; a plurality of perforated disks mounted in said casing dividing the latter into a plurality of compartments disposed end to end; a shaft extending axially through all of said compartments; a screw conveyer in each of said compartments having one end portion extending through one of said disks into an adjacent compartment; means securing one of said conveyers to said shaft; and slot and lug connections between all of the conveyers.

In testimony whereof I have signed my name to this specification, on this 14th day of November, A. D. 1916.

BENJAMIN B. FELIX.